UNITED STATES PATENT OFFICE.

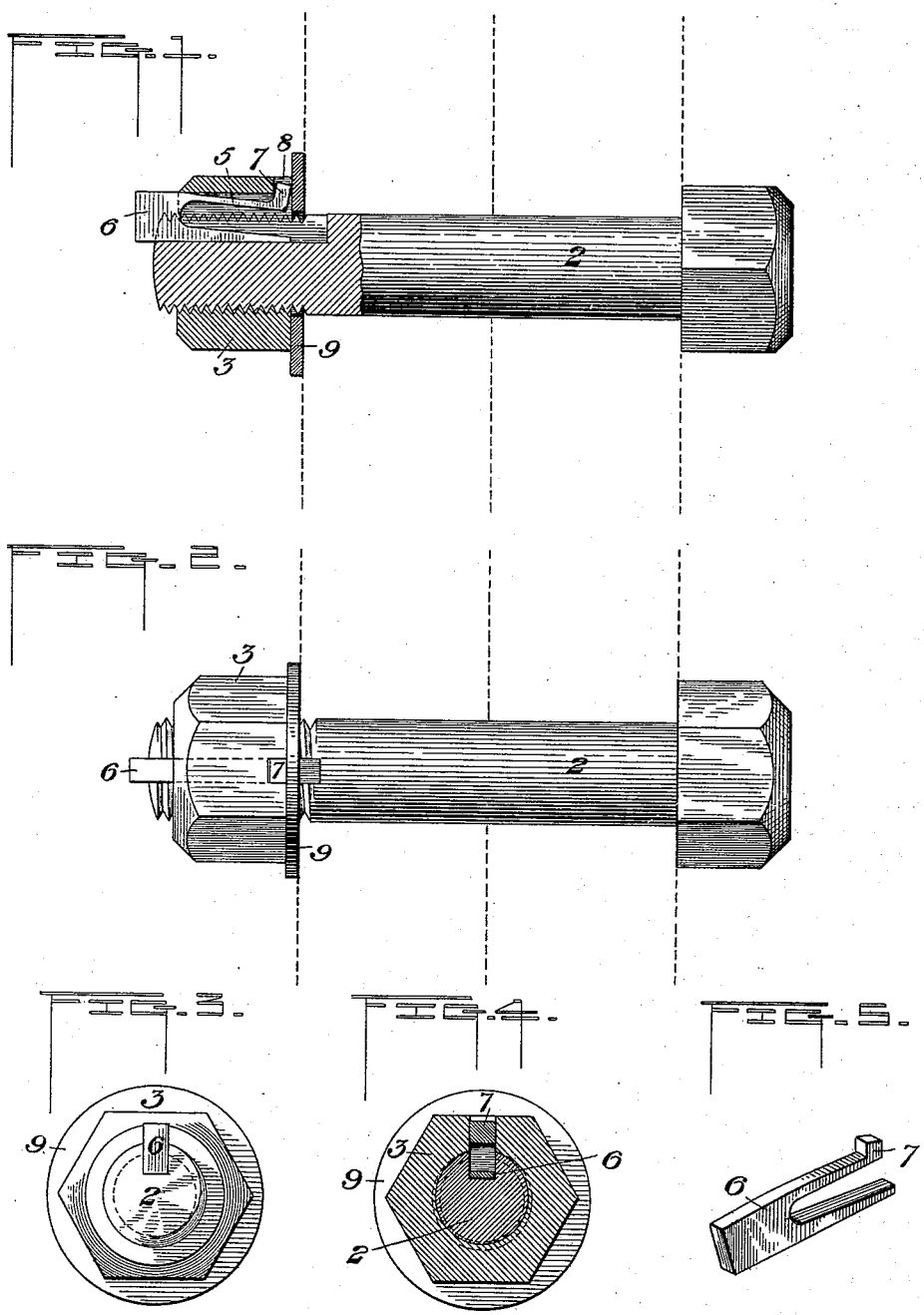

SAMUEL DURBEN, OF BRUSHTON, PENNSYLVANIA.

NUT-LOCK.

SPECIFICATION forming part of Letters Patent No. 478,096, dated July 5, 1892.

Application filed October 24, 1891. Serial No. 409,682. (No model.)

*To all whom it may concern:*

Be it known that I, SAMUEL DURBEN, of Brushton, in the county of Allegheny and State of Pennsylvania, have invented a new and useful Improvement in Nut-Locks, of which the following is a full, clear, and exact description, reference being had to the accompanying drawings, forming part of this specification, in which—

Figure 1 is a vertical longitudinal section of my improved nut-locking devices. Fig. 2 is a plan view thereof. Fig. 3 is an end view. Fig. 4 is a vertical cross-section on the line IV IV of Fig. 1. Fig. 5 is a perspective view in detail of the locking-key.

In the drawings, 2 represents the bolt, and 3 is a nut which is screwed thereon and which it is desired to lock to prevent its accidental removal or loosening. For the purpose of locking the nut on the bolt I form in the surface of the bolt a longitudinal keyway or groove 4 and in the nut a corresponding groove 5, adapted to register therewith; or, if desired, there may be several such grooves formed around the periphery of the bolt. To lock the nut on the bolt, I employ a forked spring-key 6, which is provided with a lip or projection 7, adapted to be situated at the inner side of the nut. By pressing together the fork-arms of the key it may be inserted in the slot formed by the conjunction of the grooves 4 and 5, and thus lock the nut firmly on the bolt, while the projection on the inner end of the key, fitting against the inner face of the nut, prevents the key from being accidentally withdrawn or displaced. The head is sheltered and prevented from being broken or injured by a recess 8, formed on the inner face of the nut, in which recess the head fits. If when the nut is screwed home the grooves 4 and 5 do not register, the proper position for this purpose may be secured by interposing one or more washers 9 between the back of the nut and the object to which the bolt is applied.

The key may easily be withdrawn when desired by forcing together the slotted portions by a tool inserted in the recess 8 and then withdrawing the key longitudinally.

Because of the fact that the forked portion of the key is directed inwardly and is sheltered by the nut, the solid portion only of the key being exposed, there is no danger of accidental dislodgment of the key and loosening of the nut.

The advantages of my invention will be apparent from the foregoing description. It is simple in its construction, does not require destructive cutting or mutilation of the bolt and nut to fit the key thereto, is very effective in its action, and is easy to apply or withdraw. It may be applied with advantage to nuts of all kinds, particularly to those used on parts of machinery which are subjected to vibration or jar.

I am aware of British Letters Patent No. 1,644 of 1866, and do not claim what is therein shown.

I claim as my invention—

1. The combination, with a longitudinally-grooved bolt, of a longitudinally-grooved nut having a slot at the extremity of said groove and a spring-forked key adapted to fit in the longitudinal grooves of said nut and bolt, with the free ends of the fork-arms situated inwardly and having at the end of one of said arms a locking projection adapted to enter the said slot, substantially as and for the purposes described.

2. The combination, with a longitudinally-grooved bolt, of a longitudinally-grooved nut having a slot at the extremity of said groove, and a spring-forked key adapted to fit in the longitudinal grooves of said nut and bolt, with the free ends of the fork-arms situated inwardly, and having at the end of one of said arms a locking projection adapted to enter the said slot, and a washer to close the rear of the nut, substantially as and for the purposes described.

In testimony whereof I have hereunto set my hand this 1st day of October, A. D. 1891.

SAMUEL DURBEN.

Witnesses:
THOMAS W. BAKEWELL,
W. B. CORWIN.